March 30, 1965  A. A. BAUDRAS-CHARDIGNY  3,175,283
METHOD OF MANUFACTURING A CASING FOR A TRANSMISSION
Filed April 1, 1963  2 Sheets-Sheet 2

INVENTOR.
ALFRED ALBERT BAUDRAS-CHARDIGNY
BY
ATTORNEY

3,175,283
METHOD OF MANUFACTURING A CASING FOR A TRANSMISSION

Alfred Albert Baudras-Chardigny, Paris, France, assignor to CIDMA, Courbevoie, Seine, France, a company of France
Filed Apr. 1, 1963, Ser. No. 269,649
Claims priority, application France, Apr. 2, 1962, 893,025
1 Claim. (Cl. 29—463)

It is known that in order to protect and to form the support for certain mechanical transmissions by gear trains, casings are employed which are formed by the assembly of two corresponding members, manufactured in the foundry, of which at least one is shaped as a shell, the two members being provided with one or more assembly flanges; the corresponding flanges of the two members face each other, and are pierced with holes intended to receive bolts for fixing the two members together, or other similar fixing means.

It is known on the other hand that frequently certain walls of these constituent members comprise bored orifices intended to serve as bearing surfaces, or even as bearings for various shafts carrying the gears of the gear train; in addition, some of these bearing surfaces or some of these bearings, formed in one of the constituent members, must correspond with perfect coaxiality, to the bearing surfaces or the bearings located opposite them in the other constituent member of the casing.

Now, direct machining with an absolutely accurate punching of its centre, of a bearing surface bored in a member produced in a foundry, such as the constituent members in question, can only be carried out by turning or boring. These operations are awkward because of the necessarily complicated shape and the often bulky form of such castings. On the other hand, machining by planing, milling or turning of the contact surfaces of the flanges which bring them into contact in a plane geometrically bound-up with the orientation of the axes of the bored bearing surfaces, is also complicated and costly.

The present invention has for its object to provide a remedy for these disadvantages. To this end, it has for its object a new method of manufacture of a casing for a mechanical transmission, comprising at least one shaft rotating in bearing surfaces and/or in bearings formed coaxially in walls of the casing which face each other, in accordance with which rings or bored annular members are driven by means of a press into circular openings cut-out by punching in the desired positions in half-casings which are stamped and cut-out and each provided with a peripheral assembly collar, the said rings being previously prepared by machining and having an external shape such as to cause, during the course of their driving fit, a continuous flaring and bending of the edges of the circular openings which receive them.

According to this method, the bearing surfaces are previously machined in the form of rings or bored annular members having a special appropriate external shape, the machining being conventional and being easily carried out with the highest precision, after which these rings or annular parts are driven in a suitable direction by means of a press comprising a centering counter-punch and a punch of suitable type, in circular openings cut-out by punching in the corresponding desired positions in stamped members of sheet metal which have already been given their final general individual shape, comprising a peripheral assembly collar, and having been subjected to the usual additional cutting-out and centering operations which are considered desirable.

Each of these fitting operations by driving is effected by taking the assembly collar as a geometrical base of reference, and after the driving assembly has been effected, by utilizing the rings or other driven annular members as centering references, or by making use of other centering references formed previously or during the driving operation, or again subsequently from bored, driven bearing surfaces, it is a simple matter to punch the assembly references and holes of the two constituent stamped members of the casing proper. By reason of this assembly, the bored bearing surfaces situated facing each other are strictly coaxial.

The description follows below with reference to the accompanying drawing in which.

Figure 1:
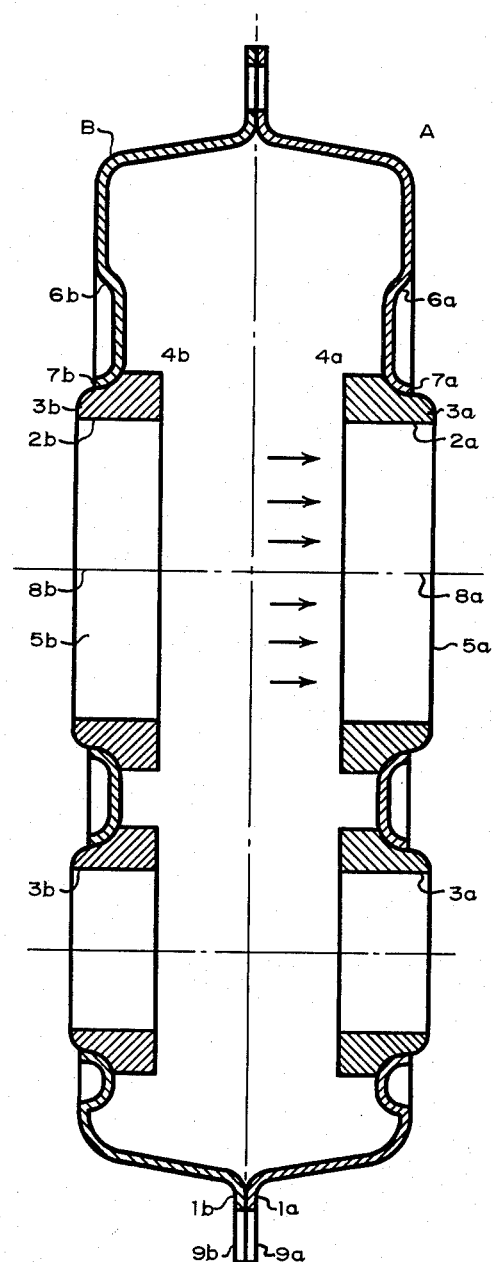
FIGURE 1 is a cross-sectional view of a transmission casing made in accordance with this invention.

Referring to FIGURE 1, the casing according to the invention is formed by two half-casings A and B of stamped sheet steel, assembled together by contact of their peripheral assembly collars $1a$ and $1b$. Each half-casing A and B carries rings which form a bearing and facing each other in pairs, each pair of facing rings being intended to hold a transverse shaft rotating in the interior of the casing. In the drawing are shown the corresponding rings mounted facing each other on the two half-casings A and B, and referenced $2a$, $2b$ and $3a$, $3b$. These rings are mounted in the same manner on the walls of the two half-casings and are produced in exactly the same way. There will therefore only be described the ring $2a$ and its placing in position in the wall of the half-casing A.

Figure 2:
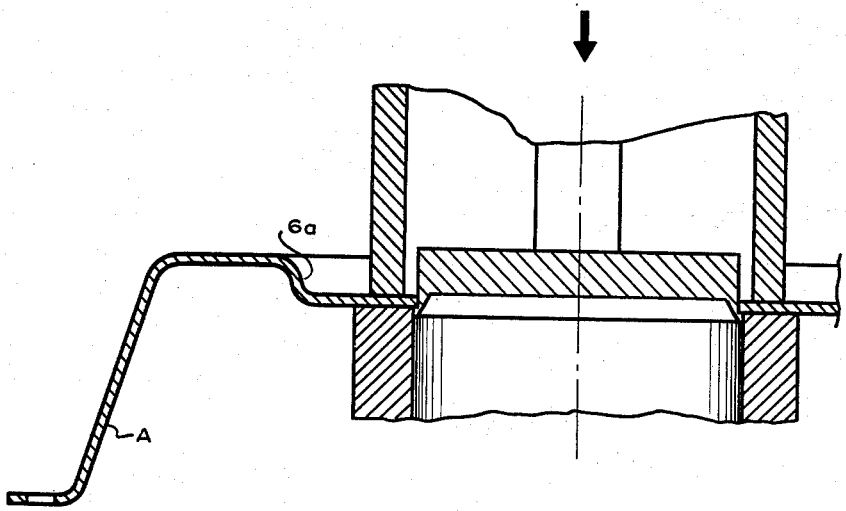
FIGURE 2 shows the step of punching a circular opening in the transmission casing at approximately the desired location.
Figure 3:
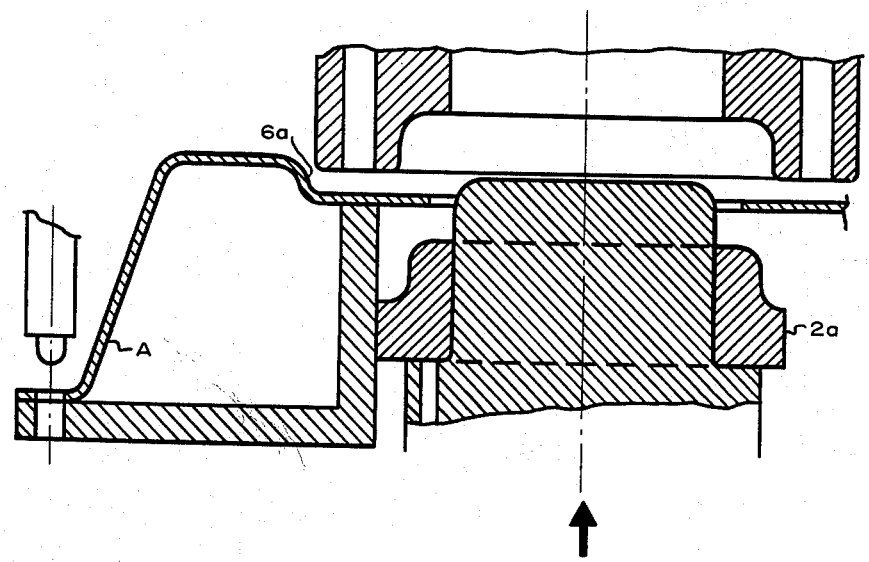
FIGURE 3 shows the step of force fitting a metal in the punched opening along a precisely positioned driving axis.

The ring $2a$ is preferably of metal, for example of steel or bronze and it comprises a peripheral portion with a rounded chamber $3a$ and a cylindrical peripheral portion $4a$. It is mounted in a orifice $5a$ in the wall of the casing A, punched-out in a zone $6a$ of that wall. This punching operation is shown in FIGURE 2. FIGURE 3 shows that the assembly is effected by forcibly driving the ring $2a$ in to the orifice $3a$ in the direction of the arrows, the edges $7a$ of the orifice $3a$ being flared and bent and becoming inset on the rounded chamfered surface $7a$ of the ring $2a$.

As has been shown in the drawing, the zone $6a$ is preferably punched, before this operation, towards the interior of the half-casing A, in order that when the ring $2a$ is once in position, it does not form an excessive projection on the outside of the half-casing A.

Finally, during the course of this operation of fitting the ring $2a$, the driving axis $8a$ has a strictly-determined position with respect to the assembly collar $1a$, and thus it is then possible to position accurately the assembly holes $9a$ in this collar with respect to the driving axis $8a$.

The half-casing B is made in exactly the same way, and the portion of the casing B corresponding to the portion designated by $n_A$ of the casing A is designated by $n_B$; during the assembly of the casing according to the invention, the corresponding rings $2a$ and $2b$ thus have their axes $8a$ and $8b$ strictly in alignment when the assembly holes $9a$ and $9b$ of the assembly collars $1a$ and $1b$ are superposed.

The operation of driving-in rings such as $2a$ is of course effected simultaneously on all the rings of the same half-casing. This operation is carried out in the conventional manner by means of a press fitted with punches and counter-punches. The punches may be either in a single piece or of the type comprising an axial centering punch sliding inside an annular press-punch, all these devices being well known to persons skilled in the art.

It should be noted that in accordance with the invention, it is preferable to carry out the punching and the finishing of the assembly holes in the assembly collars of the half-casings after the driving-in operations have been completed, utilizing as centering references either the bored bearing surfaces themselves or other centering references set-up from the said bearing surfaces, in order that by assembling together the two corresponding half-casings, a casing is finally obtained in which there is perfect coaxiality between the oppositely-facing bearing surfaces.

It will of course be understood that the invention is independent of any questions of shape and dimensions of the casing and of the half-casings, which may have very different shapes as compared with each other, of the nature of the metals employed, of the particular mechanical application to which it will be applied, and that it includes any construction which is inspired, even in part only, by its principle.

What I claim is:

A method of manufacture of a casing for a mechanical transmission, comprising two half-casings formed from stamped blanks provided with peripheral assembly collars, each half-casing comprising metal rings constituting bearing surfaces, the different rings of the two said half-casings facing each other, said method comprising essentially the steps of: punching circular openings at approximately the desired positions in the stamped blanks of the two half-casings; then force fitting the metal rings into said openings along driving axes which are precisely positioned with respect to said assembly collars, and then assembling said half-casings whereby after the assembly of the two half-casings thus formed, the corresponding rings of the two half-casings are located coaxially with each other.

References Cited by the Examiner
UNITED STATES PATENTS

| | | | |
|---|---|---|---|
| 1,304,866 | 5/19 | Floyd | 74—606 |
| 1,309,804 | 7/19 | Kelsey. | |
| 1,363,154 | 12/20 | Murray et al. | 29—463 |
| 1,430,346 | 9/22 | Wright | 74—606 |
| 1,745,199 | 1/30 | Vauclain et al. | 29—463 |
| 2,132,796 | 10/38 | Money | 29—525 X |
| 2,637,524 | 5/53 | Huvendick et al. | |
| 3,076,346 | 2/63 | Peterson. | |

WHITMORE A. WILTZ, *Primary Examiner.*